United States Patent
Hergesheimer et al.

(10) Patent No.: US 11,480,587 B2
(45) Date of Patent: Oct. 25, 2022

(54) SYSTEMS AND METHODS FOR LOW LATENCY 3-AXIS ACCELEROMETER CALIBRATION

(71) Applicant: CalAmp Corp., Irvine, CA (US)

(72) Inventors: Peter Hergesheimer, Encinitas, CA (US); Todd Sprague, Placerville, CA (US); Alexandre Dlagnekov, Escondido, CA (US)

(73) Assignee: CalAmpCorp., Irvine, CA (US)

( * ) Notice: Subject to any disclaimer, the term of this patent is extended or adjusted under 35 U.S.C. 154(b) by 423 days.

(21) Appl. No.: 16/673,241

(22) Filed: Nov. 4, 2019

(65) Prior Publication Data
US 2020/0064370 A1 Feb. 27, 2020

Related U.S. Application Data

(63) Continuation of application No. 13/770,917, filed on Feb. 19, 2013, now Pat. No. 10,466,269.

(51) Int. Cl.
*G01P 21/00* (2006.01)
*G01P 15/18* (2013.01)

(52) U.S. Cl.
CPC .............. *G01P 21/00* (2013.01); *G01P 15/18* (2013.01)

(58) Field of Classification Search
CPC . B60R 16/0232; B60R 21/0132; G01P 21/00; G01P 15/18; G01P 15/00; G01P 15/0891
See application file for complete search history.

(56) References Cited

U.S. PATENT DOCUMENTS

| | | | |
|---|---|---|---|
| 4,497,025 A | | 1/1985 | Hannoyer |
| 4,515,221 A | * | 5/1985 | van der Lely ....... A01B 69/008 73/178 R |

(Continued)

FOREIGN PATENT DOCUMENTS

| | | |
|---|---|---|
| EP | 2056298 A1 | 5/2009 |
| EP | 2083276 A1 | 7/2009 |

(Continued)

OTHER PUBLICATIONS

Dictionary.com, "telematics", https://www.dictionary.com/browse/telematics, Dictionary.com, LLC, accessed Feb. 26, 2022.*

(Continued)

*Primary Examiner* — Catherine T. Rastovski
(74) *Attorney, Agent, or Firm* — Barnes & Thornburg LLP

(57) ABSTRACT

Systems and methods for low-latency calibration of the alignment of 3-axis accelerometers in accordance embodiments of the invention are disclosed. In one embodiment of the invention, a telematics system includes a processor, an acceleration sensor, a velocity sensor, and a memory configured to store an acceleration alignment application, wherein the acceleration alignment application configures the processor to determine vehicular forward acceleration information and vehicular lateral acceleration information, calculate a lateral acceleration vector, a forward acceleration vector, and a vertical acceleration vector using a forward incline vector and a lateral incline vector determined using the vehicular forward acceleration information and vehicular lateral acceleration information.

6 Claims, 8 Drawing Sheets

(56) References Cited

U.S. PATENT DOCUMENTS

| | | | |
|---|---|---|---|
| 4,549,277 A | 10/1985 | Brunson et al. | |
| 5,058,020 A | 10/1991 | Matsuda | |
| 5,117,375 A | 5/1992 | Worcester | |
| 5,251,161 A | 10/1993 | Gioutsos et al. | |
| 5,253,173 A | 10/1993 | Drobny et al. | |
| 5,337,238 A | 8/1994 | Gioutsos et al. | |
| 5,339,242 A | 8/1994 | Jensen et al. | |
| 5,519,613 A | 5/1996 | Gioutsos et al. | |
| 5,559,699 A | 9/1996 | Gioutsos et al. | |
| 5,563,791 A | 10/1996 | Gioutsos et al. | |
| 5,587,906 A | 12/1996 | Muckley et al. | |
| 5,588,005 A | 12/1996 | Ali et al. | |
| 5,684,701 A | 11/1997 | Breed et al. | |
| 5,754,115 A | 5/1998 | Woo | |
| 5,758,301 A | 5/1998 | Saito et al. | |
| 5,767,766 A | 6/1998 | Kwun | |
| 5,780,782 A | 7/1998 | O'Dea et al. | |
| 5,805,460 A | 9/1998 | Greene et al. | |
| 5,825,283 A | 10/1998 | Camhi | |
| 5,841,201 A | 11/1998 | Ibaraki et al. | |
| 5,862,511 A | 1/1999 | Croyle et al. | |
| 5,874,675 A | 2/1999 | Edmans et al. | |
| 5,978,722 A | 11/1999 | Takasuka et al. | |
| 6,029,111 A | 2/2000 | Croyle | |
| 6,076,028 A | 6/2000 | Donnelly et al. | |
| 6,085,151 A | 7/2000 | Farmer et al. | |
| 6,163,690 A | 12/2000 | Lilja | |
| 6,236,921 B1 | 5/2001 | McConnell | |
| 6,269,290 B1 | 7/2001 | Tsuji et al. | |
| 6,308,134 B1 * | 10/2001 | Croyle | G01C 21/26 701/472 |
| 6,337,653 B1 | 1/2002 | Buchler et al. | |
| 6,346,876 B1 | 2/2002 | Flick | |
| 6,356,841 B1 | 3/2002 | Hamrick et al. | |
| 6,363,308 B1 | 3/2002 | Petti et al. | |
| 6,392,527 B1 | 5/2002 | Gilano et al. | |
| 6,401,027 B1 | 6/2002 | Xu et al. | |
| 6,417,802 B1 | 7/2002 | Diesel et al. | |
| 6,431,593 B1 | 8/2002 | Cooper et al. | |
| 6,438,475 B1 | 8/2002 | Gioutsos et al. | |
| 6,532,419 B1 * | 3/2003 | Begin | G01C 25/005 701/504 |
| 6,540,255 B1 | 4/2003 | Garcia et al. | |
| 6,611,755 B1 | 8/2003 | Coffee et al. | |
| 6,737,989 B2 | 5/2004 | Flick | |
| 6,756,885 B1 | 6/2004 | Flick | |
| 6,812,888 B2 | 11/2004 | Drury et al. | |
| 6,832,140 B2 | 12/2004 | Fan et al. | |
| 6,912,557 B1 | 6/2005 | North et al. | |
| 7,015,830 B2 | 3/2006 | Flick | |
| 7,020,501 B1 | 3/2006 | Elliott et al. | |
| 7,050,897 B2 | 5/2006 | Breed et al. | |
| 7,085,637 B2 | 8/2006 | Breed et al. | |
| 7,110,880 B2 | 9/2006 | Breed et al. | |
| 7,158,016 B2 | 1/2007 | Cuddihy et al. | |
| 7,250,850 B2 | 7/2007 | Mizutani | |
| 7,272,493 B1 | 9/2007 | Hamrick et al. | |
| 7,286,929 B2 | 10/2007 | Staton et al. | |
| 7,348,895 B2 | 3/2008 | Lagassey et al. | |
| 7,366,608 B2 | 4/2008 | Hamrick et al. | |
| 7,460,954 B2 | 12/2008 | Hamrick et al. | |
| 7,484,756 B2 | 2/2009 | Chou et al. | |
| 7,527,288 B2 | 5/2009 | Breed et al. | |
| 7,577,525 B2 | 8/2009 | Hamrick et al. | |
| 7,607,510 B1 | 10/2009 | Mun et al. | |
| 7,643,919 B2 | 1/2010 | Nicaise | |
| 7,671,727 B2 | 3/2010 | Flick | |
| 7,725,218 B2 | 5/2010 | Hamrick et al. | |
| 7,765,039 B1 | 7/2010 | Hagenbuch | |
| 7,767,766 B2 | 8/2010 | Tilbrook | |
| 7,805,231 B2 | 9/2010 | Cluff et al. | |
| 7,805,276 B1 | 9/2010 | Byers et al. | |
| 8,004,397 B2 | 8/2011 | Forrest et al. | |
| 8,010,251 B2 | 8/2011 | Hamrick et al. | |
| 8,032,278 B2 | 10/2011 | Flick | |
| 8,155,841 B2 | 4/2012 | Erb | |
| 8,460,197 B1 * | 6/2013 | Brady | A61B 5/1118 600/503 |
| 8,489,271 B2 | 7/2013 | Hergesheimer et al. | |
| 8,688,380 B2 | 4/2014 | Cawse et al. | |
| 8,749,350 B2 | 6/2014 | Geisler et al. | |
| 8,762,009 B2 | 6/2014 | Ehrman et al. | |
| 8,799,034 B1 | 8/2014 | Brandmaier et al. | |
| 8,812,173 B2 | 8/2014 | Chen et al. | |
| 8,874,279 B2 | 10/2014 | Frye et al. | |
| 8,996,240 B2 | 3/2015 | Plante | |
| 9,002,538 B2 | 4/2015 | Hergesheimer et al. | |
| 9,171,460 B2 | 10/2015 | Chen | |
| 9,179,497 B1 | 11/2015 | Teixeira et al. | |
| 9,217,757 B2 | 12/2015 | Hergesheimer et al. | |
| 9,406,222 B2 | 8/2016 | Hergesheimer et al. | |
| 9,457,754 B1 | 10/2016 | Christensen et al. | |
| 9,459,277 B2 | 10/2016 | Hergesheimer et al. | |
| 9,491,420 B2 | 11/2016 | Mimar | |
| 9,644,977 B2 | 5/2017 | Camisa | |
| 10,055,909 B2 | 8/2018 | Jenkins et al. | |
| 10,102,689 B2 | 10/2018 | Hergesheimer et al. | |
| 10,107,831 B2 | 10/2018 | Hergesheimer et al. | |
| 2002/0013648 A1 | 1/2002 | Feser et al. | |
| 2002/0100310 A1 | 8/2002 | Beqin | |
| 2002/0124166 A1 | 9/2002 | Lee et al. | |
| 2002/0135167 A1 | 9/2002 | Mattes et al. | |
| 2003/0001368 A1 | 1/2003 | Breed et al. | |
| 2003/0028766 A1 | 2/2003 | Gass et al. | |
| 2003/0151507 A1 | 8/2003 | Andre et al. | |
| 2003/0176959 A1 | 9/2003 | Breed et al. | |
| 2003/0236970 A1 | 12/2003 | Palmer et al. | |
| 2004/0036261 A1 | 2/2004 | Breed et al. | |
| 2004/0075539 A1 | 4/2004 | Savoie et al. | |
| 2004/0088090 A1 | 5/2004 | Wee | |
| 2004/0155790 A1 | 8/2004 | Tsuji et al. | |
| 2004/0257208 A1 | 12/2004 | Huang et al. | |
| 2005/0065711 A1 | 3/2005 | Dahlgren et al. | |
| 2005/0099289 A1 | 5/2005 | Arita et al. | |
| 2006/0022469 A1 | 2/2006 | Syed et al. | |
| 2006/0041336 A1 | 2/2006 | Schubert et al. | |
| 2006/0047459 A1 | 3/2006 | Underbrink et al. | |
| 2006/0050953 A1 | 3/2006 | Farmer et al. | |
| 2007/0027612 A1 | 2/2007 | Barfoot et al. | |
| 2007/0109117 A1 | 5/2007 | Heitzmann et al. | |
| 2007/0229251 A1 | 10/2007 | Ehrman et al. | |
| 2007/0257791 A1 | 11/2007 | Arita et al. | |
| 2007/0266078 A1 | 11/2007 | Rittle et al. | |
| 2007/0271014 A1 | 11/2007 | Breed | |
| 2007/0299587 A1 | 12/2007 | Breed | |
| 2008/0111666 A1 | 5/2008 | Plante | |
| 2008/0114545 A1 | 5/2008 | Takaoka | |
| 2008/0128600 A1 | 6/2008 | Ogisu et al. | |
| 2008/0150707 A1 | 6/2008 | Shamoto | |
| 2008/0195261 A1 | 8/2008 | Breed | |
| 2008/0202199 A1 | 8/2008 | Finley | |
| 2008/0211666 A1 | 9/2008 | Saidi et al. | |
| 2008/0211914 A1 | 9/2008 | Herrera | |
| 2008/0275601 A1 | 11/2008 | Saito | |
| 2008/0281618 A1 | 11/2008 | Mermet et al. | |
| 2009/0015392 A1 | 1/2009 | Takahashi et al. | |
| 2009/0037056 A1 | 2/2009 | Erb | |
| 2009/0217733 A1 | 9/2009 | Stachow et al. | |
| 2009/0249858 A1 | 10/2009 | Ishikawa et al. | |
| 2010/0039216 A1 | 2/2010 | Knight | |
| 2010/0039247 A1 | 2/2010 | Ziegler | |
| 2010/0039318 A1 | 2/2010 | Kmiecik | |
| 2010/0042286 A1 | 2/2010 | Lich | |
| 2010/0097316 A1 | 4/2010 | Shaw | |
| 2010/0122246 A1 | 5/2010 | Gesquiere et al. | |
| 2010/0185524 A1 | 7/2010 | Watkins | |
| 2010/0231002 A1 | 9/2010 | Yoshioka et al. | |
| 2010/0241838 A1 | 9/2010 | Cohen et al. | |
| 2010/0279647 A1 | 11/2010 | Jacobs | |
| 2010/0312473 A1 | 12/2010 | Hoshizaki | |
| 2010/0318257 A1 * | 12/2010 | Kalinadhabhotla | G01P 21/00 701/31.4 |
| 2011/0004444 A1 | 1/2011 | Farrow et al. | |
| 2011/0060496 A1 | 3/2011 | Nielsen | |

(56) References Cited

U.S. PATENT DOCUMENTS

| | | |
|---|---|---|
| 2011/0106373 A1 | 5/2011 | Hergesheimer |
| 2011/0109438 A1 | 5/2011 | Dijkstra et al. |
| 2011/0153367 A1 | 6/2011 | Amigo |
| 2011/0202225 A1 | 8/2011 | Willis |
| 2011/0202305 A1 | 8/2011 | Willis et al. |
| 2011/0218710 A1 | 9/2011 | Trinh et al. |
| 2011/0264393 A1 | 10/2011 | An et al. |
| 2011/0307205 A1 | 12/2011 | Vassilieff |
| 2011/0320088 A1 | 12/2011 | Eom |
| 2012/0022780 A1 | 1/2012 | Kulik et al. |
| 2012/0035881 A1 | 2/2012 | Rubin |
| 2012/0050095 A1 | 3/2012 | Scherzinger et al. |
| 2012/0072078 A1 | 3/2012 | Oosaki et al. |
| 2012/0146766 A1 | 6/2012 | Geisler et al. |
| 2012/0158211 A1 | 6/2012 | Chen |
| 2012/0253585 A1* | 10/2012 | Harvie .................. G07C 5/085 701/32.5 |
| 2012/0253892 A1 | 10/2012 | Davidson |
| 2012/0259526 A1 | 10/2012 | Inoue et al. |
| 2012/0303203 A1 | 11/2012 | Olsen |
| 2012/0331181 A1 | 12/2012 | Govande et al. |
| 2013/0002415 A1 | 1/2013 | Walli |
| 2013/0013907 A1 | 1/2013 | Marino et al. |
| 2013/0024202 A1 | 1/2013 | Harris |
| 2013/0038439 A1 | 2/2013 | Saito |
| 2013/0073142 A1 | 3/2013 | Hergesheimer et al. |
| 2013/0204572 A1 | 8/2013 | Sato |
| 2013/0275001 A1 | 10/2013 | Hergesheimer |
| 2013/0297137 A1 | 11/2013 | Fushiki |
| 2013/0320654 A1 | 12/2013 | Clark et al. |
| 2014/0069837 A1 | 3/2014 | Naruishi et al. |
| 2014/0074353 A1 | 3/2014 | Lee |
| 2014/0111354 A1 | 4/2014 | Hergesheimer |
| 2014/0118132 A1 | 5/2014 | Braunberger et al. |
| 2014/0142886 A1 | 5/2014 | Hergesheimer et al. |
| 2014/0143940 A1 | 5/2014 | Iuliano et al. |
| 2014/0149145 A1* | 5/2014 | Peng ....................... G06Q 40/08 702/150 |
| 2014/0173581 A1 | 6/2014 | Grinberg et al. |
| 2014/0180529 A1 | 6/2014 | Simon |
| 2014/0189335 A1 | 7/2014 | Liu et al. |
| 2014/0236519 A1 | 8/2014 | Hergesheimer |
| 2014/0300739 A1 | 10/2014 | Mimar |
| 2014/0309843 A1 | 10/2014 | Chen et al. |
| 2014/0357295 A1 | 12/2014 | Skomra et al. |
| 2014/0358394 A1 | 12/2014 | Picciotti |
| 2015/0015385 A1 | 1/2015 | Tomita |
| 2015/0051796 A1 | 2/2015 | Levy |
| 2015/0105099 A1 | 4/2015 | Luo et al. |
| 2015/0149218 A1 | 5/2015 | Bayley et al. |
| 2015/0161391 A1 | 6/2015 | Johnsen et al. |
| 2015/0248731 A1 | 9/2015 | Fernandes et al. |
| 2015/0339241 A1 | 11/2015 | Warner et al. |
| 2016/0094964 A1 | 3/2016 | Barfield et al. |
| 2016/0133130 A1 | 5/2016 | Grimm et al. |
| 2016/0162284 A1 | 6/2016 | Meng et al. |
| 2016/0335813 A1 | 11/2016 | Hergesheimer |
| 2016/0341559 A1 | 11/2016 | Camisa |
| 2016/0362075 A1 | 12/2016 | Dlagnekov |
| 2017/0017766 A1 | 1/2017 | Giraud |
| 2017/0023610 A1 | 1/2017 | Hergesheimer et al. |
| 2017/0236339 A1 | 8/2017 | Camisa |
| 2018/0012429 A1 | 1/2018 | Jenkins et al. |
| 2018/0053354 A1 | 2/2018 | Jenkins et al. |
| 2018/0164401 A1 | 6/2018 | Hergesheimer |
| 2019/0075377 A1 | 3/2019 | Jenkins et al. |

FOREIGN PATENT DOCUMENTS

| | | |
|---|---|---|
| EP | 2959376 A1 | 12/2015 |
| EP | 2923277 B1 | 9/2017 |
| EP | 2959376 B1 | 7/2018 |
| GB | 2506365 A | 4/2014 |
| JP | 2007178295 A | 7/2007 |
| KR | 2009097547 A | 9/2009 |
| WO | 2000017607 | 3/2000 |
| WO | 200218873 A2 | 3/2002 |
| WO | 2013076695 A1 | 5/2013 |
| WO | 2014049352 A1 | 4/2014 |
| WO | 2014081485 A1 | 5/2014 |
| WO | 2014130077 A1 | 8/2014 |
| WO | 2014130078 A1 | 8/2014 |
| WO | 2015121639 A1 | 8/2015 |
| WO | 2015183677 A1 | 12/2015 |
| WO | 2016191306 | 12/2016 |
| WO | 2016200589 A1 | 12/2016 |
| WO | 2018009578 A1 | 1/2018 |
| WO | 2018035065 A1 | 2/2018 |

OTHER PUBLICATIONS

International Preliminary Report on Patentability for International Application PCT/US2017/046824, Report issued Feb. 19, 2019, dated Feb. 28, 2019, 9 Pgs.

International Preliminary Report on Patentability for International Application PCT/US2017/040763, Report issued Jan. 8, 2019, dated Jan. 17, 2019, 7 Pgs.

International Preliminary Report on Patentability for International Application PCT/US2016/033625, Report issued Dec. 12, 2017, dated Dec. 21, 2017, 6 Pgs.

International Preliminary Report on Patentability for International Application PCT/US2016/033621, Report issued Nov. 28, 2017, dated Dec. 7, 2017, 7 Pgs.

International Search Report and Written Opinion for International Application No. PCT/US2017/046824, Search completed Oct. 13, 2017, dated Oct. 27, 2017, 10 Pgs.

International Search Report and Written Opinion for International Application No. PCT/US2017/040763, Search completed Aug. 22, 2017, dated Sep. 8, 2017, 15 Pgs.

Extended European Search Report for European Application No. 17160719.5, Search completed Apr. 6, 2017, dated Apr. 18, 2017, 6 Pgs.

Extended European Search Report for European Application No. 13875911.3, Search completed Nov. 22, 2016, dated Dec. 9, 2016, 6 Pgs.

Extended European Search Report for European Application No. 13875407.2, Search completed Nov. 22, 2016, dated Nov. 30, 2016, 7 Pgs.

International Search Report and Written Opinion for International Application No. PCT/US2016/033625, Search completed Jul. 19, 2016, dated Aug. 18, 2016, 7 Pgs.

International Search Report and Written Opinion for International Application No. PCT/US2016/033621, Search completed Jul. 28, 2016, dated Aug. 5, 2016, 11 Pgs.

International Preliminary Report on Patentability for International Application PCT/US2013/054939, Report Issued Aug. 25, 2015, dated Sep. 3, 2015, 4 Pgs.

International Preliminary Report on Patentability for International Application PCT/US2013/054943, Report Issued Aug. 25, 2015, dated Sep. 3, 2015, 6 Pgs.

International Preliminary Report on Patentability for International Application PCT/US2013/054956, Report Issued May 26, 2015, dated Jun. 4, 2015, 9 Pgs.

International Search Report and Written Opinion for International Application No. PCT/US2013/054956, Search completed Feb. 11, 2014, dated Mar. 6, 2014, 9 Pgs.

International Search Report and Written Opinion for International Application No. PCT/US13/54943, International Filing Date Aug. 14, 2013, Search Completed Feb. 13, 2014, dated Feb. 27, 2014, 6 pgs.

International Search Report and Written Opinion for International Application No. PCT/US13/54939, International Filing Date Aug. 14, 2013, Search Completed Febmary 5, 2014, dated Feb. 24, 2014, 5 pgs.

Memsic 2125 Dual-Axis Accelerometer (#28017) Data Sheet (Parallax Inc., v2.0 Jan. 29, 2009), 70 pgs.

(56) References Cited

OTHER PUBLICATIONS

Surface Vehicle Recommended Practice, E/E Diagnostic Test Modes, Revised Jun. 10, 1994, 32 pgs.
Surface Vehicle Recommended Practice; OBD II Scan Tool, Revised Jun. 1994, 14 pgs.
Road vehicles—Diagnostic Systems—Part 2: CARB requirements for interchange of digital information, ISO 9141-2, 1994, 18 pgs.
Surface Vehicle Recommended Practice, Universal Interface for OBD II Scan, Jun. 30, 1993, 45 pgs., SAE International Surface Vehicle Recommended Practice, Universal Interface for OBD II Scan, SAE Standard J2201, Issued Jun. 30, 1993.

* cited by examiner

SYSTEMS AND METHODS FOR LOW LATENCY 3-AXIS ACCELEROMETER CALIBRATION

CROSS REFERENCE TO RELATED APPLICATIONS

The current application is a continuation of U.S. patent application Ser. No. 13/770,917 entitled "Systems and Methods for Low Latency 3-Axis Accelerometer Calibration" to Hergesheimer et al., filed Feb. 19, 2013, the disclosure of which is hereby incorporated by reference in its entirety.

FIELD OF THE INVENTION

The present invention is generally related to calibrating the alignment of a 3-axis accelerometer and more specifically to the low latency calibration of 3-axis accelerometers to align with a vehicle's axis.

BACKGROUND OF THE INVENTION

A Global Positioning System (GPS) is a space based global navigation satellite system that utilizes a network of geo-synchronous satellites that can be utilized by a GPS receiver to determine its location. Many telematics systems incorporate a Global Positioning System (GPS) receiver, which can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through the Earth's atmosphere, and multipath distortions. Additionally, other factors not listed above can influence GPS signals and result in measurement errors.

An accelerometer is a device that measures acceleration associated with the weight experienced by a test mass in the frame of reference of the accelerometer device. The acceleration measured by an accelerometer is therefore a weight per unit of test mass, or g-force. Thereby, a stationary accelerometer in a vehicle would experience the earth's gravity while a free falling one would not.

SUMMARY OF THE INVENTION

Systems and methods for low latency calibration of the alignment of 3-axis accelerometers in accordance embodiments of the invention are disclosed. In one embodiment of the invention, a telematics system includes a processor, an acceleration sensor connected to the processor and configured to determine forward acceleration information along a forward axis, lateral acceleration information along a lateral axis, and vertical acceleration information along a vertical axis, a velocity sensor connected to the processor and configured to determine velocity information along a vehicular forward axis and heading information, and a memory connected to the processor and configured to store an acceleration alignment application, wherein the acceleration alignment application configures the processor to determine vehicular forward acceleration information along the vehicular forward axis using the velocity information, determine vehicular lateral acceleration information using the velocity information and the heading information, calculate a lateral acceleration vector using the forward acceleration information, the lateral acceleration information, the vertical acceleration information, and the vehicular lateral acceleration information, calculate a forward acceleration vector using the lateral acceleration vector and the vehicular forward acceleration information, calculate a vertical acceleration vector using the lateral acceleration vector and the forward acceleration vector, compute lateral alignment information using the lateral acceleration vector, the forward acceleration information, the lateral acceleration information, and the vertical acceleration information, compute forward alignment information using the forward acceleration vector, the forward acceleration information, the lateral acceleration information, and the vertical acceleration information, an compute vertical alignment information using the vertical acceleration vector, the forward acceleration information, the lateral acceleration information, and the vertical acceleration information.

In an another embodiment of the invention, the acceleration alignment application further configures the processor to calculate the lateral acceleration vector by determining a lateral incline vector using a calibrated forward vector, the forward acceleration information, the lateral acceleration information, the vertical acceleration information, and the vehicular lateral acceleration information and calculating the lateral acceleration vector using the calibrated forward vector and the lateral incline vector.

In an additional embodiment of the invention, the calibrated forward vector aligns the vehicular forward axis with the forward axis.

In yet another additional embodiment of the invention, the acceleration alignment application further configures the processor to determine a vehicular lateral axis using the heading information and the vehicular forward acceleration information and the calibrated forward vector further aligns the vehicular lateral axis with the lateral axis.

In still another additional embodiment of the invention, the lateral acceleration vector is the normalized cross product of the calibrated forward vector and the lateral incline vector.

In yet still another additional embodiment of the invention, the acceleration alignment application further configures the processor to calculate the forward acceleration vector by determining a forward incline vector using the lateral acceleration vector, the lateral incline vector, the vehicular forward acceleration information, the forward acceleration information, the lateral acceleration information, and the vertical acceleration information and calculating the forward acceleration vector using the forward incline vector and the lateral acceleration vector.

In yet another embodiment of the invention, the forward acceleration vector is the normalized cross product of the forward incline vector and the lateral acceleration vector.

In still another embodiment of the invention, the acceleration alignment application further configures the processor to calculate the vertical acceleration vector using the lateral acceleration vector and the forward acceleration vector.

In yet still another embodiment of the invention, the vertical acceleration vector is the normalized cross product of the lateral acceleration vector and the forward acceleration vector.

In yet another additional embodiment of the invention, the acceleration sensor is a 3-axis accelerometer and the acceleration sensor is configured to determine an acceleration sensor vector including the forward acceleration information, the lateral acceleration information, and the vertical acceleration information.

Still another embodiment of the invention includes a method for calibrating acceleration information using a telematics system, where the telematics system is mounted in the vehicle having a vehicular forward axis, a vehicular lateral axis, and a vehicular vertical axis, including determining vehicular forward acceleration information along a vehicular forward axis using the telematics system, determining vehicular lateral acceleration information along a vehicular lateral axis using the telematics system, calculating a lateral acceleration vector using the vehicular lateral acceleration information using the telematics system, calculating a forward acceleration vector using the lateral acceleration vector and the vehicular forward acceleration information using the telematics system, calculating a vertical acceleration vector using the lateral acceleration vector and the forward acceleration vector using the telematics system, computing lateral alignment information using the lateral acceleration vector using the telematics system, computing forward alignment information based on the forward acceleration vector using the telematics system, and computing vertical alignment information based on the vertical acceleration vector using the telematics system.

In yet another additional embodiment of the invention, calculating the lateral acceleration vector further includes determining a lateral incline vector using a calibrated forward vector using the telematics system and calculating the lateral acceleration vector using the calibrated forward vector and the lateral incline vector using the telematics system.

In still another additional embodiment of the invention, the calibrated forward vector aligns the vehicular forward axis with the forward axis using the telematics system.

In yet still another additional embodiment of the invention, calibrating acceleration information includes determining a vehicular lateral axis using the telematics system, and aligning the vehicular lateral axis with the lateral axis using the calibrated forward vector using the telematics system.

In yet another embodiment of the invention, calculating the lateral acceleration vector further includes calculating a normalized cross product of the calibrated forward vector and the lateral incline vector using the telematics system.

In still another embodiment of the invention, calculating the forward acceleration vector further includes determining a forward incline vector using the telematics system and calculating the forward acceleration vector using the forward incline vector and the lateral acceleration vector using the telematics system.

In yet still another embodiment of the invention, calculating the forward acceleration vector further includes calculating a normalized cross product of the forward incline vector and the lateral acceleration vector using the telematics system.

In yet another additional embodiment of the invention, calculating the vertical acceleration vector is based on the lateral acceleration vector and the forward acceleration vector using the telematics system.

In still another additional embodiment of the invention, calculating the vertical acceleration vector further includes calculating the normalized cross product of the lateral acceleration vector and the forward acceleration vector using the telematics system.

In yet still another additional embodiment of the invention, calibrating acceleration information includes determining an acceleration sensor vector including the forward acceleration information, the lateral acceleration information, and vertical acceleration information using the telematics system.

DETAILED DESCRIPTION

Figure 1:
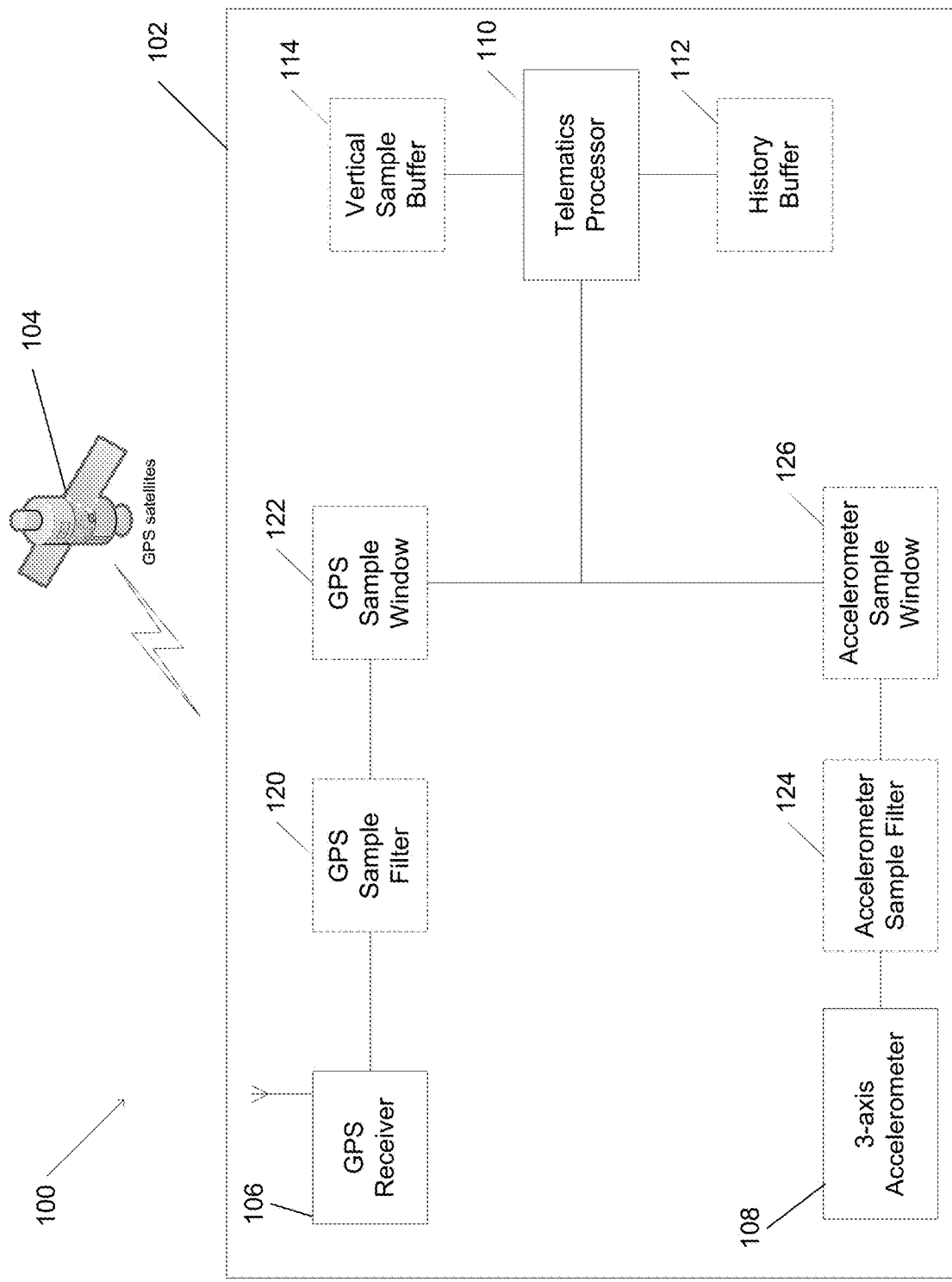
FIG. 1 illustrates a system for calibrating a 3-axis accelerometer with an accelerometer, GPS unit and telematics processor in accordance with an embodiment of the invention.

Turning now to the drawings, systems and methods for low latency acceleration alignment in order to reduce calibration delays in telematics systems in accordance with embodiments of the invention are illustrated. Information concerning vehicle speed and acceleration can provide insights into driver behavior. For example, such information can indicate a variety of driver behaviors, including, but not limited to, performing hard cornering or suddenly stopping while driving. In accordance with many embodiments of the invention, vehicle speed may be calculated using information provided by a Global Position System (GPS) receiver by dividing the distance traveled by the GPS receiver by the time between measurements taken by the GPS receiver. In a number of embodiments, the GPS receiver is configured to determine heading information. In several embodiments, the GPS receiver is configured to determine velocity information using the signals received by the GPS receiver. A GPS receiver can determine velocity information in a variety of ways in accordance with embodiments of the invention, including, but not limited to, measuring the Doppler shift of the received signals. The differences in vehicle speed between measurements taken by the GPS receiver may be used to determine acceleration information for the vehicle. However, the use of GPS data to calculate acceleration information is dependent upon a variety of factors, such as reception and satellite availability, which may present problems when calculating the acceleration information. In accordance with embodiments of the invention, a variety of devices configured to determine location and/or velocity information other than GPS receivers may be used.

Acceleration information for a vehicle may also be captured using an accelerometer or other device configured to determine acceleration information; these devices are often installed on a vehicle or mobile device. Accelerometers installed on a vehicle may not be accurately aligned with the vehicle axes, limiting the accuracy of the acceleration data captured by the accelerometer. In a number of embodiments, the accelerometer axes do not change relative to the vehicle axes. A 3-axis accelerometer is an accelerometer configured to determine acceleration in the X, Y, and Z axes, corresponding to the forward, lateral, and vertical vectors measured by the 3-axis accelerometer. Accurate accelerometer data aligned with the axes of the vehicle is beneficial in many applications, including, but not limited to, telematics. Telematics is the integrated use of telecommunications and informatics, including, but not limited to, monitoring vehicle movement and behavior.

In accordance with embodiments of the invention, a 3-axis accelerometer is calibrated to align with a vehicle's vertical, lateral, and forward axes using acceleration information and location information of the vehicle. In many embodiments, the location information is captured using a GPS receiver and the acceleration information is captured using the 3-axis accelerometer, although other devices capable of capturing location and/or acceleration information may be utilized in accordance with embodiments of the invention. These measurements may be taken based upon an occurrence of certain events, in response to a request for calibration, and/or performed continuously. In many embodiments, acceleration and location information is measured when location information captured using the GPS receiver indicates that the vehicle is stationary. In several embodiments, acceleration and location information is measured when the location information captures using the GPS receiver indicates that the vehicle is in motion and/or that the vehicle is traveling over a certain speed. Data analysis, including filtering, may be utilized to filter useful data from erroneous or irrelevant measurements captured by the 3-axis accelerometer and/or GPS receiver and/or aligned data computed using the 3-axis accelerometer and/or GPS receiver data.

However, delays may be present in the calibration of vehicle axes to accelerometer axes; such delays can be a function of the accumulated number of acceleration and/or velocity samples and the period over which the samples were accumulated. Telematics units in accordance with embodiments of the invention are configured to perform low latency calibration of vehicle axes to accelerometer axes by determining lateral incline vectors and forward incline vectors using the velocity and acceleration information captured using the GPS receiver and the 3-axis accelerometer. Using the lateral incline vector and the forward incline vector, telematics units can quickly determine the aligned forward, lateral, and vertical vectors with a lower delay than computing the aligned forward, lateral, and vertical vectors using the accumulated samples. In a variety of embodiments, the calibration delay using the lateral incline vector and the forward incline vector is approximately half the sample period; however, other calibration delays are possible in accordance with the requirements of embodiments of the invention.

Systems and methods for calibrating a 3-axis accelerometer to align with the axes of a vehicle utilizing information captured using an accelerometer and/or a GPS receiver in accordance with embodiments of the invention are discussed further below.

Telematics System Architecture

Telematics systems are utilized in vehicles to determine and/or report the location and behavior of the vehicle. A telematics system containing a 3-axis accelerometer aligned to vehicle axes in accordance with an embodiment of the invention is illustrated in FIG. 1. The telematics system 100 includes a telematics unit 102, where the telematics unit 102 includes a GPS receiver 106, a 3-axis accelerometer 108, and a telematics process 110. The GPS receiver 106 and the 3-axis accelerometer 108 are configured to communicate with a telematics processor 110. The GPS receiver 106 is configured to receive signals from one or more GPS satellites 104, if available. In accordance with embodiments of the invention, the GPS receiver 106 and the 3-axis accelerometer 108 are configured to provide information to the telematics processor 110 at a sample rate; the GPS sample rate of the GPS receiver 106 and the accelerometer sample rate of the 3-axis accelerometer 108 are independent and determined dynamically or pre-determined.

In several embodiments, the GPS receiver 106 is configured to determine location information using signals received from a number of GPS satellites 104. In many embodiments, the GPS receiver 106 is configured to determine velocity and/or acceleration information using the received location information. In a number of embodiments, the GPS receiver is configured to determine velocity information by measuring the Doppler shift of the signals received from the GPS satellites 104. In a variety of embodiments, a vertical sample buffer 114 is utilized to store vertical vector samples; the stored vertical vector samples can be processed to compensate for errors in the received GPS information. In many embodiments, the 3-axis accelerometer 108 can generate 3-axis acceleration data from vehicle motion. In many embodiments, the telematics processor 110 is configured to calibrate the 3-axis accelerometer 108 to correlate the 3-axis acceleration data generated by the 3-axis accelerometer 108 to the axes of the vehicle in which the telematics system 100 is installed using velocity and/or acceleration information. In a number of embodiments, the telematics processor 110 is configured to determine velocity and/or acceleration information using location information received using the GPS receiver 106. In multiple embodiments, the telematics processor 110 utilizes acceleration and/or velocity information generated by the GPS receiver 106.

In several embodiments, the telematics unit 102 includes a GPS sample filter 120 and/or an accelerometer sample filter 124. The GPS sample filter 120 is configured to sample and convert the sampling rate of the GPS receiver 106. The accelerometer sample filter 124 is configured to sample and convert the sampling rate of the 3-axis accelerometer 108. In many embodiments, the GPS sample filter 120 and/or the accelerometer sample filter 124 are configured to match the GPS sampling rate to the accelerometer sampling rate. For example, if the GPS receiver 106 has a sampling rate of 250 milliseconds and the 3-axis accelerometer 108 has a sampling rate of 50 milliseconds, the accelerometer sample filter 124 can utilize five samples generated using the 3-axis accelerometer 108 to match the 250 millisecond sample rate of the GPS receiver 106. The accelerometer sample filter 124 and/or the GPS sample filter 120 perform the rate matching in a variety of ways, including, but not limited to, averaging information received, selecting the highest sample received, selecting the smallest sample received, selecting one sample at random, and/or selecting the last sample. In many embodiments, the accelerometer sample filter 124 and/or the GPS sample filter 120 are implemented using the telematics processor 110 and/or the history buffer 112. In a variety of embodiments, the sampling rates of the GPS receiver and the accelerometer do not need to be synchronized in order to calibrate the axes of the accelerometer with the vehicle axes.

In a number of embodiments, the telematics unit 102 includes a GPS sample window 122 configured to store one or more samples received using the GPS receiver 106. In several embodiments, the telematics unit 102 includes an accelerometer sample window 126 configured to store one or more samples received using the 3-axis accelerometer 108. In many embodiments, the telematics processor 110 can accumulate information provided by the GPS receiver 106 and the 3-axis accelerometer 108 along with calibration information using a history buffer 112. In several embodiments, the telematics processor 110 is configured to use the accumulated information to calculate lateral incline vectors and forward incline vectors. Using the lateral incline vectors and the forward incline vectors, the telematics processor 110 is configured to perform the calibration of the 3-axis accelerometer 108 to the vehicle axes. In a number of embodiments, the telematics processor 110 is configured to adapt the calibration of the 3-axis accelerometer 108 to the vehicle axes using the location and/or velocity information determined using the GPS receiver 106. In many embodiments, the GPS sample window 122, the accelerometer sample window 126, and/or the vertical sample buffer 114 is implemented using the telematics processor 110 and/or the history buffer 112.

A specific telematics system is described above; however, a variety of telematics systems, including those that receive location information without using a GPS receiver, may be utilized in accordance with embodiments of the invention. Processes for calibrating a 3-axis accelerometer relative to the axes of a vehicle to which the 3-axis accelerometer is installed are discussed further below.

Comparison of Accelerometer Axes and Vehicle Axes

Figure 2:
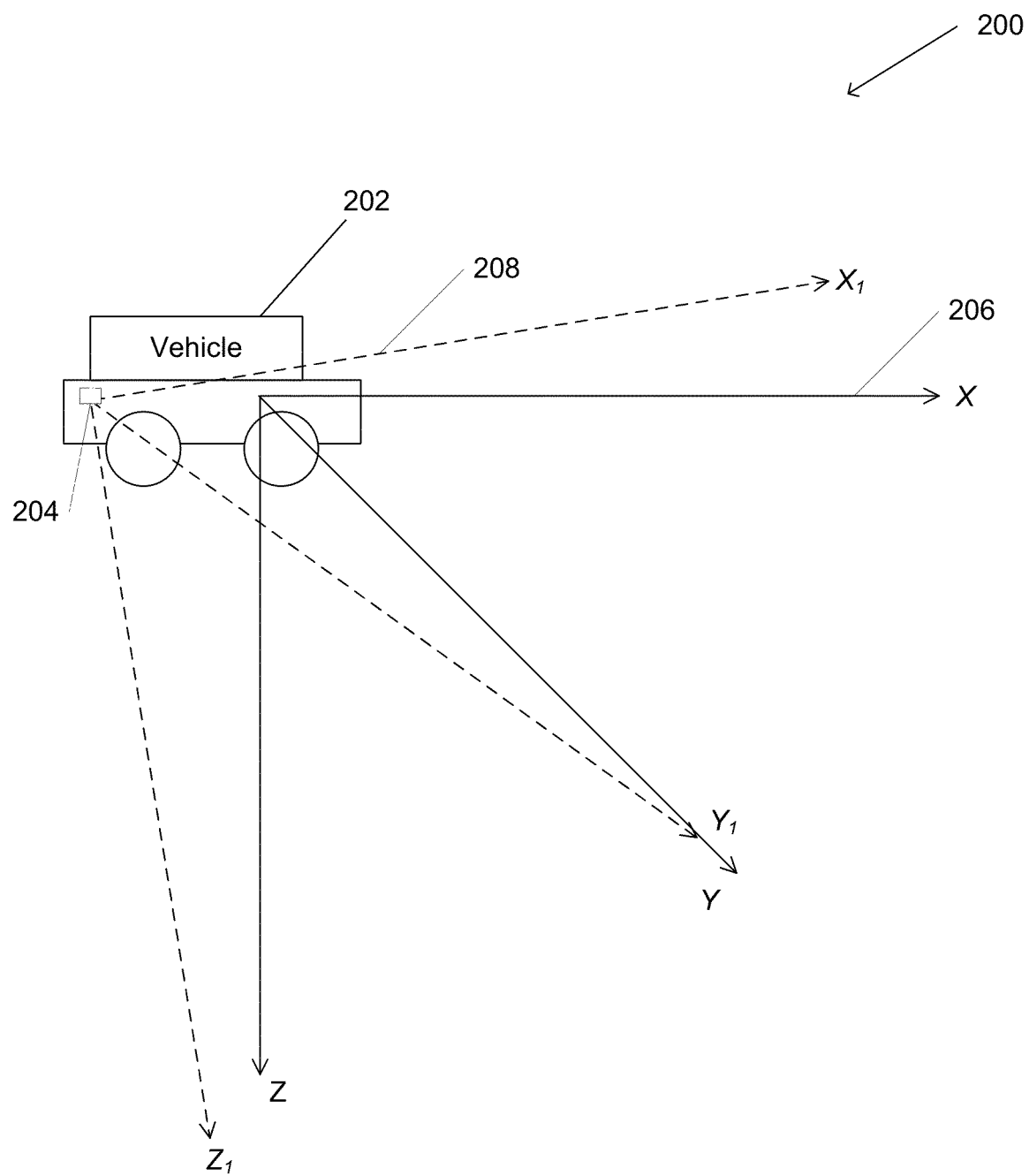
FIG. 2 illustrates the alignment of the axes of a 3-axis accelerometer to the axes of a vehicle in accordance with an embodiment of the invention.

In order to provide accurate acceleration information, a 3-axis accelerometer is calibrated to the axes of the vehicle in which the 3-axis accelerometer is installed. An illustration of the relative alignment of the axes of a 3-axis accelerometer to the axes of a vehicle in accordance with embodiments of the invention is shown in FIG. 2. Coordinate axes 200 show the relative alignment of the axes 208 of a 3-axis accelerometer 204 and the axes 206 of a vehicle 202 to which the accelerometer is mounted. The X, Y and Z coordinate axes 206 are the axes of a vehicle. The $X_1, Y_1$ and $Z_1$ axes are the axes 208 of the 3-axis accelerometer 204. In the illustrated embodiment, the axes 208 of the 3-axis accelerometer 204 are not aligned with the axes 206 of the vehicle 202. Therefore, in order to determine acceleration along the axes 206 of the vehicle, the 3-axis accelerometer's 204 axes 208 $X_1, Y_1$ and $Z_1$ are calibrated with respect to the axes 206 X, Y and Z of the vehicle 202; processes for performing this calibration are discussed in more detail below. In many embodiments of the invention, the axes X, Y and Z of the vehicle 202 correspond to a gravity vector, a lateral directional vector of travel along a horizontal plane, and the orthogonal to the gravity vector and the lateral motion vector; accordingly, the calibration of the accelerometer's 204 axes 208 $X_1, Y_1$ and $Z_1$ are to the gravity vector, the lateral motion vector, and the orthogonal of the gravity vector and the lateral motion vector. In many embodiments, the 3-axis accelerometer 204 is part of a telematics system installed in the vehicle 202.

Although a specific relative alignment between the axes of a 3-axis accelerometer and a vehicle described above, a variety of alignments, including those where the axes of a 3-axis accelerometer are aligned to a gravity vector, a lateral motion vector, and the orthogonal of the gravity vector and the lateral motion vector, may be utilized in accordance with embodiments of the invention. Processes for calibrating 3-axis accelerometers in accordance with embodiments of the invention are described below.

3-Axis Accelerometer Calibration Using GPS Location Information

Figure 3:
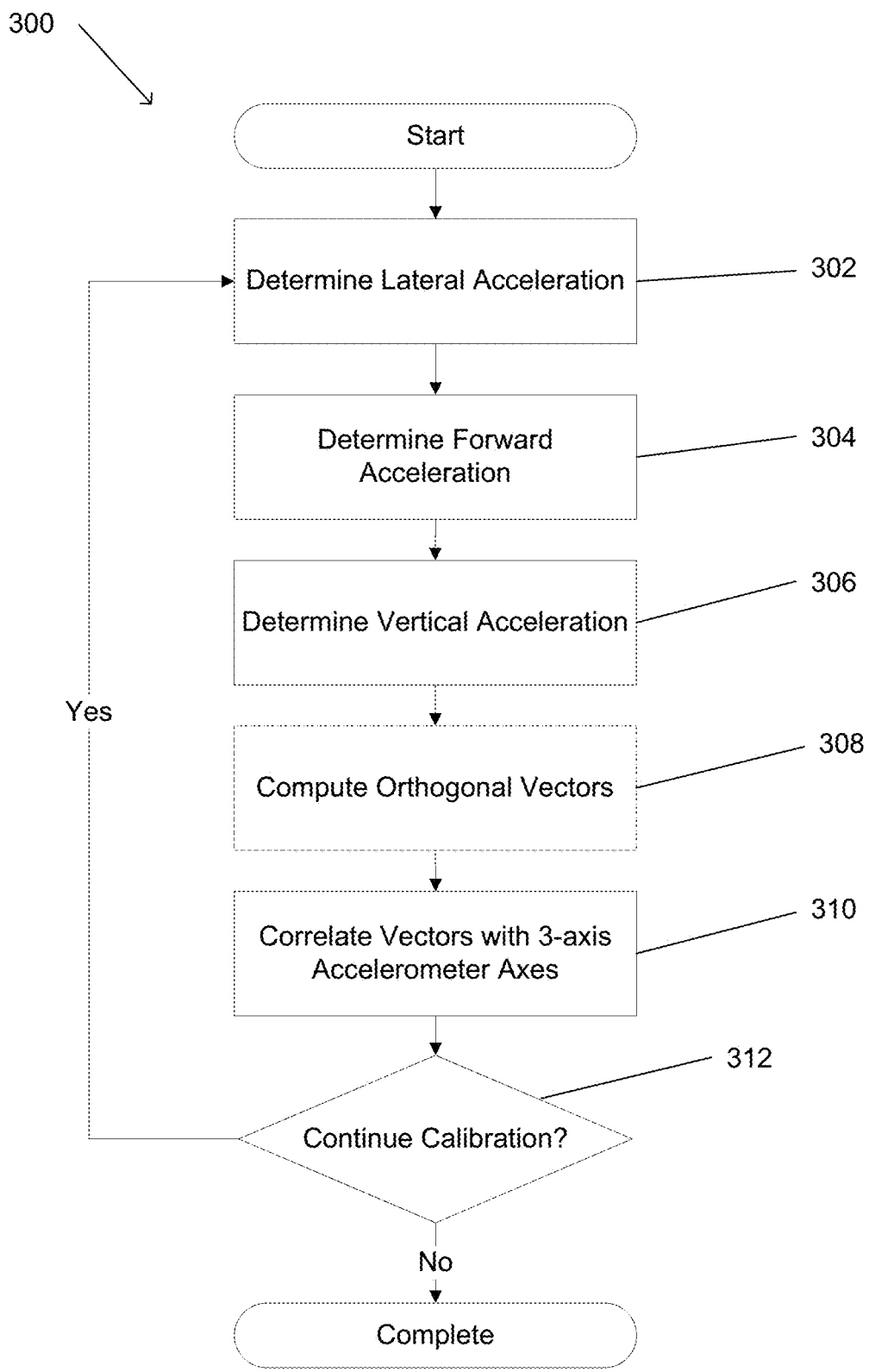
FIG. 3 is a flow chart illustrating a process for calibrating the axes of an accelerometer to the vertical, forward and lateral axes of a vehicle in accordance with an embodiment of the invention.

The location, velocity, and acceleration of a vehicle can be captured using a GPS receiver and utilized to determine the motion of the axes of a vehicle relative to the Earth. This information can be correlated to information measured using a 3-axis accelerometer, thereby calibrating the 3-axis accelerometer to the vehicle. A process for calibrating the axes of a 3-axis accelerometer to the vertical, forward and lateral axes of a vehicle containing both the 3-axis accelerometer and the GPS receiver in accordance with an embodiment of the invention is illustrated in FIG. 3.

The process 300 includes determining (302) lateral acceleration. Forward acceleration is determined (304). Vertical acceleration is determined (306). In several embodiments, orthogonal vectors representing the vertical, forward, and lateral vectors are computed (308). The vertical, forward, and lateral vectors are correlated (310) to the axes of the 3-axis accelerometer. If necessary, the calibration process continues (312) beginning with step 302. If the calibration process does not continue (312), the process ends.

In many embodiments, lateral acceleration is determined (302) using information captured using a 3-axis accelerometer when a GPS receiver indicates that the vehicle is not in motion. In a number of embodiments, forward acceleration is determined (304) using information measured using the 3-axis accelerometer when location information measured using the GPS receiver indicates that the vehicle is in motion. In several embodiments, forward acceleration is determined (304) when a vehicle exceeds a predetermined speed. In several embodiments, vertical acceleration is determined (306) by computing the cross product of the lateral acceleration and forward acceleration. In many embodiments, the orthogonal vectors are computed (308) by calculating the cross product of every combination of the forward acceleration, the lateral acceleration, and the vertical acceleration. In a number of embodiments, calibration continues (312) if the magnitude of the correlation between the 3-axis accelerometer and the vertical, forward, and lateral vectors exceeds a threshold value. In several embodiments, the calibration continues (312) while the vehicle is in motion. In many embodiments, the calibration continues (312) while the vehicle is turned on. In a number of embodiments, the calibration is only performed once and does not continue (312). In a number of embodiments, the calibration process continues (312) when the determined (302, 304, 306) lateral, forward, and/or vertical accelerations exceed a threshold value; the threshold value may be predetermined or determined dynamically. In several embodiments, the calibration process continues (312) until a certain number of successful calibration attempts have been reached; the number of successful calibration attempts may be pre-determined or determined dynamically.

In accordance with many embodiments of the invention, the determined (302, 304, 306) vertical, forward, and/or lateral accelerations are stored in a history buffer. Correlating (310) the vertical, forward, and lateral accelerations with the 3-axis accelerometer axes utilizes the stored vertical, forward, and/or lateral accelerations. In certain embodiments, once a new lateral acceleration is determined (302), correlating (310) the accelerations with the 3-axis accelerometer axes utilizes the lateral acceleration and forward and vertical accelerations stored in the history buffer. Likewise, in several embodiments, once a new forward acceleration is determined (304), calibration (310) utilizes vertical and lateral accelerations stored in the history buffer. In various embodiments, the vertical, forward, and/or lateral accelerations stored in the history buffer are used to predetermine what a vehicle's vertical, forward and lateral axes are and an accelerometer's axes system are calibrated to fit the predetermined vehicle axes. In many embodiments, the vertical, forward, and/or lateral accelerations stored in the history buffer correlate to GPS acceleration samples taken using the GPS receiver and/or accelerometer acceleration samples taken using the 3-axis accelerometer.

In accordance with embodiments of the invention, correlating (310) the vectors corresponding with the axes of the vehicle with the 3-axis accelerometer axes may be performed using a least squares method. Given motion vector samples $[X_i, Y_i, Z_i]$, where i is the number of motion vector samples, vertical alignment vector $[V_x, V_y, V_z]$, forward GPS acceleration sample F and lateral GPS acceleration sample $L_i$ and vertical acceleration $$V_i = \sqrt{X_i^2 + Y_i^2 + Z_i^2 - F_i^2 - L_i^2}$$

the alignment vectors which calibrate the axes of the 3-axis accelerometer to the axes of the vehicle are calculated by:

$$B_1 = A_{11}*V_x + A_{12}*V_y + A_{13}*V_z$$

$$B_2 = A_{12}*V_x + A_{22}*V_y + A_{23}*V_z$$

$$B_3 = A_{13}*V_x + A_{23}*V_y + A_{33}*V_z$$

where $$A_{11} = \Sigma X_i^2$$

$$A_{12} = \Sigma X_i * Y_i$$

$$A_{13} = \Sigma X_i * Z_i$$

$$A_{22} = \Sigma Y_i^2$$

$$A_{23} = \Sigma Y_i * Z_i$$

$$A_{33} = \Sigma Z_i^2$$

$$B_1 = \Sigma V_i * X_i$$

$$B_2 = \Sigma V_i * Y_i$$

$$B_3 = \Sigma V_i * Z_i$$

In accordance with embodiments of the invention, the vertical alignment vector $[V_x, V_y, V_z]$ is determined using a Gaussian elimination process. For example, $$V_z = \frac{D_2 * C_{11} - D_1 * C_{12}}{C_{11} * C_{22} - C_{12}^2}$$

$$V_y = \frac{D_1 * C_{22} - D_2 * C_{12}}{C_{11} * C_{22} - C_{12}^2}$$

and $V_x$ is the maximum of $$V_x = \frac{B_1 - A_{12} * V_y - A_{13} * V_z}{A_{11}}$$

$$V_x = \frac{B_2 - A_{22} * V_y - A_{23} * V_z}{A_{12}}$$

$$V_x = \frac{B_3 - A_{23} * V_y - A_{33} * V_z}{A_{13}}$$

where $$C_{11} = A_{11} * A_{22} - A_{12}^2$$

$$C_{12} = A_{11} * A_{23} - A_{12} * A_{13}$$

$$C_{22} = A_{11} * A_{33} - A_{13}^2$$

$$D_1 = B_2 * A_{11} - B_1 * A_{12}$$

$$D_2 = B_3 * A_{11} - B_1 * A_{13}$$

Although a specific process for calibrating the axes of a 3-axis accelerometer to the axes of a vehicle is discussed above with respect to FIG. 3, any of a variety of processes, including those which obtain information related to the location, velocity, and/or acceleration of a vehicle using devices other than GPS receivers, may be performed in accordance with embodiments of the invention. In particular, processes for the low latency calibration of the axes of a 3-axis accelerometer to the axes of the vehicle are discussed below with respect to FIG. 7. Processes for calibrating the axes of a 3-axis accelerometer in accordance with embodiments of the invention are disclosed below.

Vertical Vector Calibration

Figure 4:
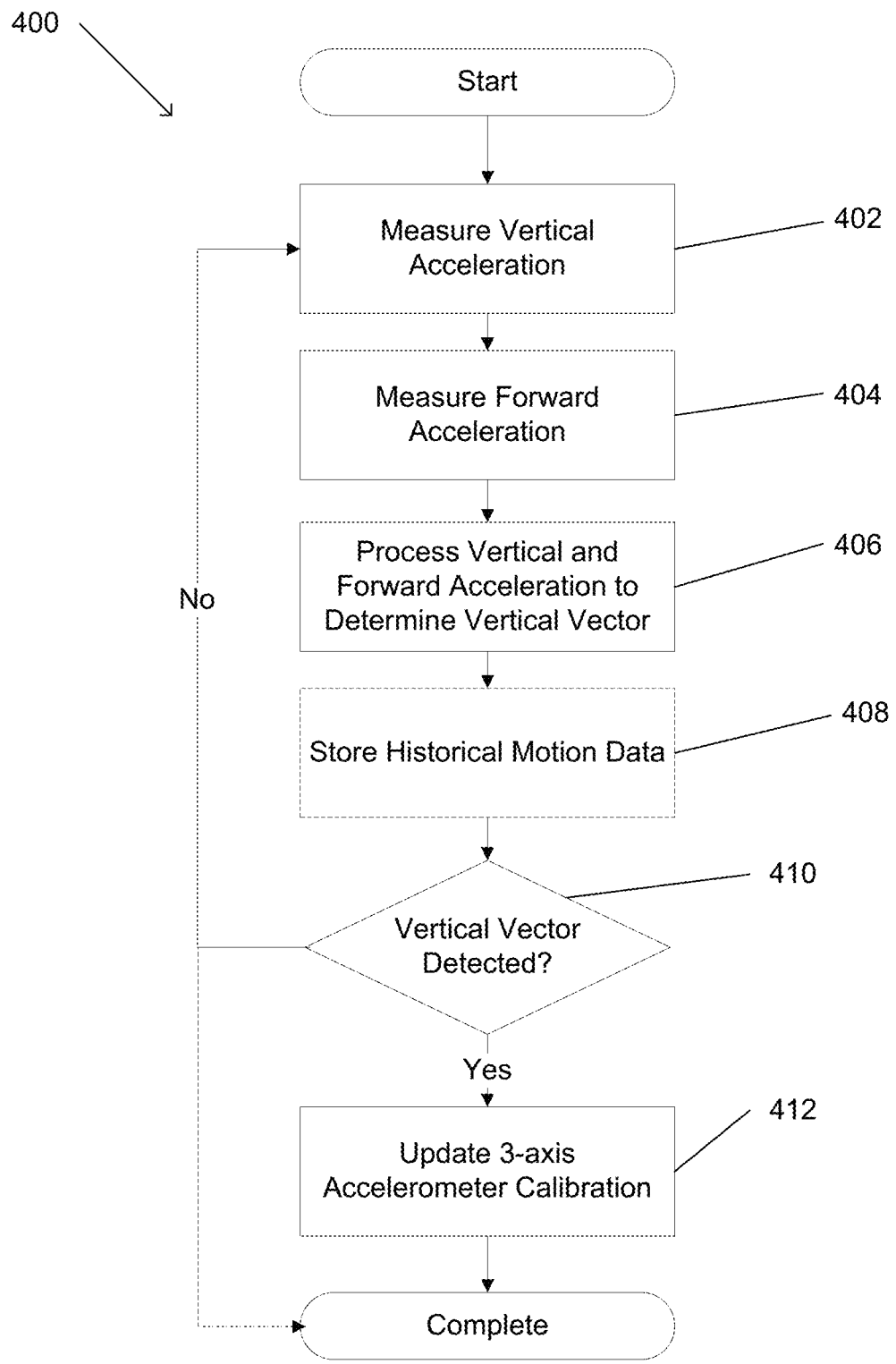
FIG. 4 is a flow chart illustrating a process for calibrating a 3-axis accelerometer along its vertical vector in accordance with an embodiment of the invention.

Filtering the information measured using a 3-axis accelerometer, a GPS receiver, and/or data aligning the 3-axis accelerometer and the GPS receiver can eliminate erroneous data, including, but not limited to, data from a vehicle stopped on an incline. A process for calibrating a vertical vector measured using a 3-axis accelerometer to filter erroneous data in accordance with an embodiment of the invention is illustrated in FIG. 4. The process 400 includes measuring (402) vertical acceleration using a 3-axis accelerometer. The forward acceleration of the 3-axis accelerometer is measured (404). The forward acceleration and the vertical acceleration are processed (406) to determine a vertical vector. In several embodiments, the vertical acceleration and/or the forward acceleration are stored (408) as part or all of the historical motion data. If the vertical vector is detected (410) in the processed (408) vertical and forward accelerations, the 3-axis accelerometer calibration is updated (412) to compensate for the vertical vector. In a number of embodiments, if a vertical vector is not detected (410), the process 400 repeats. In many embodiments, if a vertical vector is not detected (410), the process 400 ends.

In many embodiments, the vertical vector is measured (402) when the speed of the vehicle exceeds a threshold; the threshold may be pre-determined or determined dynamically. In several embodiments, the forward acceleration of the 3-axis accelerometer is measured (404) when the forward acceleration exceeds a threshold acceleration; the threshold acceleration may be pre-determined or determined dynamically. In a number of embodiments, the motion of the vehicle is determined using a GPS receiver. In several embodiments, elevation data measured using the GPS receiver is utilized to determine whether the vehicle is likely stopped on an incline. In many embodiments, determining that the vehicle is at rest using the GPS receiver involves no change in GPS receiver position over time. In a number of embodiments, detecting no GPS receiver movement can involve a determination of whether there is any GPS receiver movement over time that takes consideration of erroneous GPS receiver movement readings. In many embodiments, the motion of the vehicle is determined using the 3-axis accelerometer. In several embodiments, detecting constant acceleration using an accelerometer is made in an event with no movement of a vehicle as detected by a GPS receiver. In several embodiments, the stored (408) historical motion data includes data captured using the GPS receiver and/or 3-axis accelerometer. In certain embodiments, only a selection of data is stored (408) as historical motion data, such as data that corresponds to certain events of interest. In a number of embodiments, all data captured using the GPS receiver and/or 3-axis accelerometer is stored (408) as historical motion data.

For example, when the GPS receiver indicates that a vehicle is stationary and the 3-axis accelerometer experiences constant acceleration, an assumption can be made that the vehicle is stationary and that the 3-axis accelerometer output is indicative of vertical acceleration due to gravity. When both the 3-axis accelerometer and the GPS receiver indicate vehicle speeds above a certain threshold value and increasing with a constant direction, an assumption can be made that the vehicle is accelerating in approximately a straight line. When a calibration event occurs, the calibration of the 3-axis accelerometer is updated (412) utilizing the determined (406) vertical vector to compensate for the vertical acceleration due to gravity as measured by the 3-axis accelerometer.

In numerous embodiments, the processing (406) of current motion data includes analysis and filtering of data to provide data veracity. In several embodiments, current measured (402, 404) vertical and forward accelerations are processed (406) using historical motion data. Data analysis can utilize filters, including least mean squares, least squares, and Gaussian elimination methods, including those described above with respect to FIG. 3.

Although specific processes are discussed above for calibrating a 3-axis accelerometer to compensate for acceleration along its vertical vector, any of a variety of processes can be utilized, including processes that operate on vehicles that are in motion, in accordance with embodiments of the invention. In particular, alternative techniques for calibrating a 3-axis accelerometer that utilize vertical sample buffers to compensate for measurement errors in the vertical vector are discussed in more detail below with respect to FIG. 8 and processes for the low latency determination of vertical alignment information are discussed below with respect to FIG. 7. Processes for calibrating a 3-axis accelerometer along its forward vector in accordance with embodiments of the invention are described below.

Lateral Vector Calibration

Figure 5:
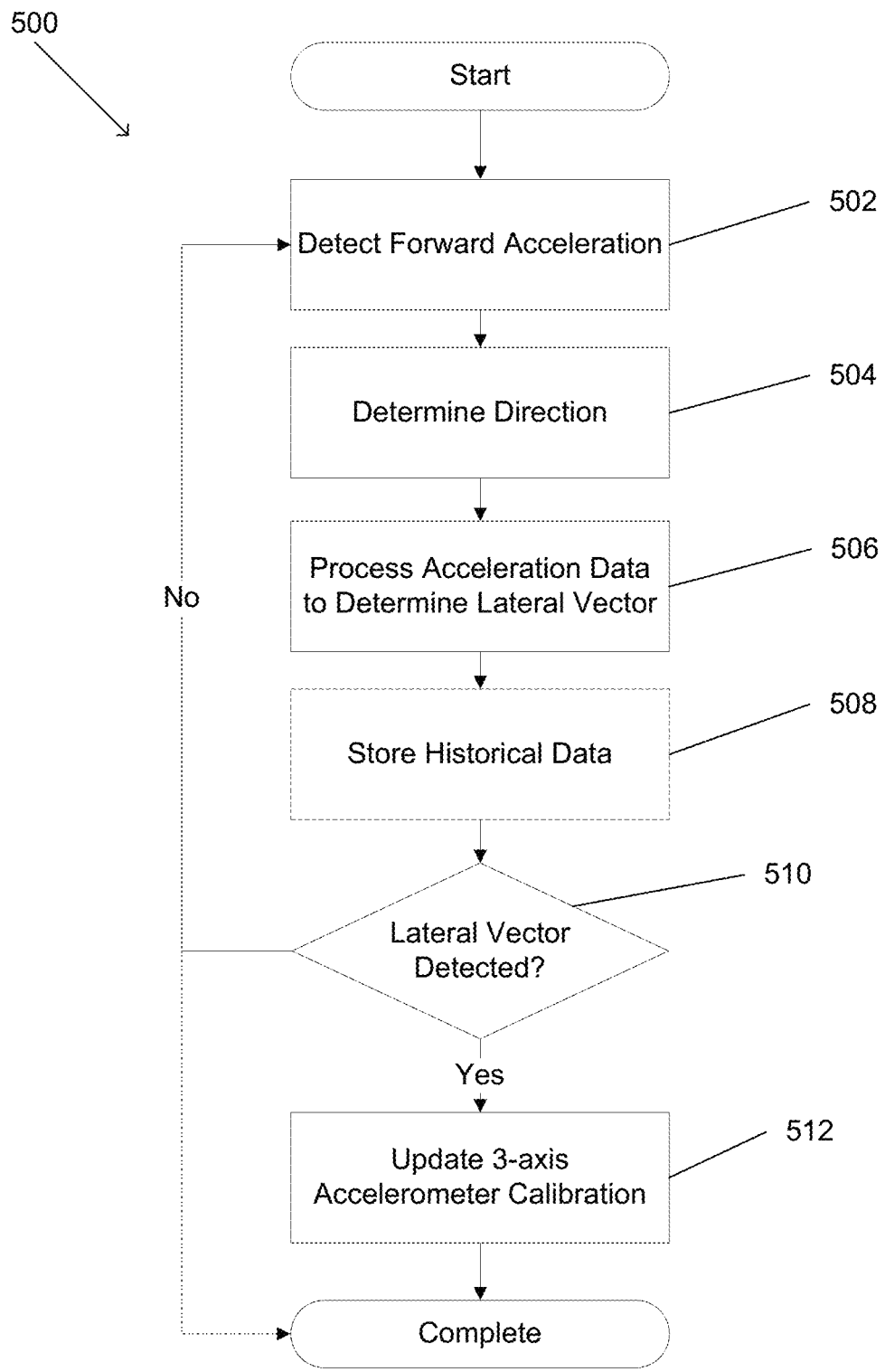
FIG. 5 is a flow chart illustrating a process for calibrating a 3-axis accelerometer along its lateral vector in accordance with an embodiment of the invention.

Filtering the lateral vector measured by a 3-axis accelerometer allows a telematics unit to compensate for measurement errors, including measurements made when a vehicle is moving backwards or turning very slightly. A process for calibrating a 3-axis accelerometer along its lateral axis in accordance with an embodiment of the invention is illustrated in FIG. 5. The process 500 includes detecting (502) data related to the forward acceleration of a vehicle. The direction of the acceleration is determined (504). The acceleration data is processed (506) to determine a lateral vector. In a number of embodiments, the acceleration data is stored (508) as part of all of the historical motion data. If a lateral vector is detected (510), the calibration of the 3-axis accelerometer is updated (512) using the lateral vector. In many embodiments, if no lateral vector is detected (510), the process 500 repeats. In several embodiments, if no lateral vector is detected (510), the process 500 is complete.

In many embodiments, detecting (502) data related to the forward acceleration of a vehicle includes determining that the velocity of the vehicle exceeds a threshold velocity. In several embodiments, the velocity of the vehicle may be detected (502) using a GPS receiver and/or a 3-axis accelerometer. The GPS receiver and/or 3-axis accelerometer may also be utilized to determine (504) the direction in which the vehicle is traveling. In a number of embodiments, the vehicle is traveling in a constant direction. Analysis of data received using a GPS receiver can determine (504) whether the direction of motion is unchanging by comparing current values to past values. Similarly, analysis of data received using a 3-axis accelerometer can determine (504) whether the direction of acceleration is unchanging by comparing current acceleration to past values for any changes in acceleration direction. Certain embodiments only use a GPS receiver or only use a 3-axis accelerometer to determine (504) constant direction; other embodiments use both a GPS receiver and a 3-axis accelerometer to determine (504) a constant direction. Several embodiments use a GPS receiver to check data received using a 3-axis accelerometer or vice versa. In various embodiments, a constant direction is not one in which data indicates the direction data is rigidly constant, but takes into account errors and discrepancies that may come from erroneous direction data, such as an inaccurate GPS reading or measurement errors in a 3-axis accelerometer.

Analysis of data can be used to determine whether the data is indicative of a lateral vector. Indications of a lateral vector can filter out data that is likely an outlier, such as data indicating that a vehicle is moving backward rather than forward. This can include filtering out events indicating that a vehicle is slowly backing out of a parking spot before turning and driving in a forward direction. Data analysis can utilize filters, including, but not limited to, least mean squares, least squares, and Gaussian elimination methods, including those described above with respect to FIG. 3.

A specific process is described above with respect to FIG. 5 for calibrating the forward axis of a 3-axis accelerometer with respect to a lateral vector; however, any of a variety of processes can be utilized, including processes that do not rely upon uniform forward motion of the vehicle, in accordance with an embodiment of the invention. Processes for the low latency calibration of the forward axis of a 3-axis accelerometer using lateral incline vectors in accordance with embodiments of the invention are discussed below with respect to FIG. 7. Processes for calibrating a 3-axis accelerometer using an average forward vector in accordance with embodiments of the invention are discussed below.

3-Axis Accelerometer Calibration Using an Average Forward Vector

Figure 6:
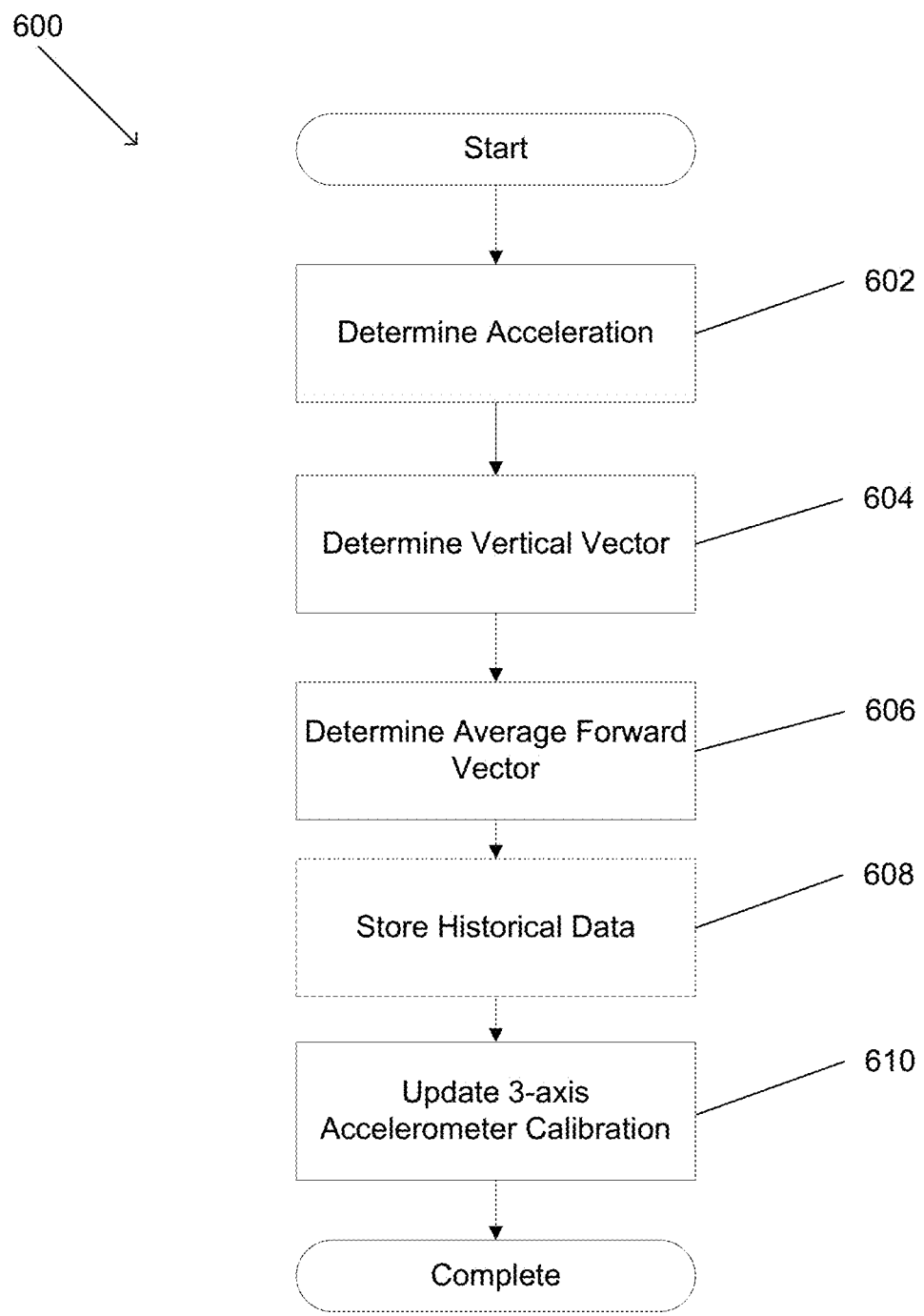
FIG. 6 is a flow chart illustrating a process for determining an average forward vector used in the calibration of 3-axis accelerometer in accordance with an embodiment of the invention.

Once a vertical vector and/or a lateral vector have been determined, an average forward vector can be computed; this average forward vector is used to calibrate the forward acceleration measured using a 3-axis accelerometer to the forward motion of the vehicle in which the 3-axis accelerometer is mounted. A process for determining an average forward vector used to calibrate a 3-axis accelerometer in accordance with en embodiment of the invention is illustrated in FIG. 6. The process 600 includes determining (602) acceleration information. A vertical vector is determined (604). An average forward vector is determined (606). In many embodiments, the vertical, lateral, and/or average forward vectors are stored (608) as historical data. The calibration of a 3-axis accelerometer is updated (610).

In many embodiments, acceleration information is determined (602) utilizing a GPS receiver and/or a 3-axis accelerometer. In many embodiments, the vertical vector is determined (604) using a process similar to the one described above with respect to FIG. 4. In a number of embodiments, determining (604) the vertical vector includes multiplying a normalized vertical vector by acceleration information stored as historical data. In several embodiments, determining (606) the average forward vector includes determining a lateral vector using a process similar to the one described above with respect to FIG. 5. In many embodiments, determining the lateral vector includes subtracting the determined (604) vertical vector from the determined (602) acceleration information. The vertical vector and/or acceleration information used to determine the lateral vector may be stored (608) as historical data. In a number of embodiments, determining (606) the average forward vector utilizes the lateral vector and the angle between the lateral vector and a measured forward vector. In several embodiments, the measured forward vector is determined using forward acceleration information captured using a 3-axis accelerometer. In many embodiments, the measured forward vector is a previously calculated average forward vectored stored as historical data. In a number of embodiments, determining (606) the average forward vector uses one or both of the determined (602) acceleration and the determined (604) vertical vector. In many embodiments, a certain amount of acceleration information and/or a certain number of vertical vectors and/or average forward vectors are stored (608) as historical data before the 3-axis accelerometer calibration is updated (610). The amount of acceleration information and/or number of vectors stored may be determined dynamically and/or pre-determined.

A specific process is described above with respect to FIG. 6 for calibrating a 3-axis accelerometer using a determined average forward vector; however, any of a variety of processes, including those which utilize an average lateral vector and those which determine a lateral vector, can be utilized in accordance with an embodiment of the invention. Processes for a low latency determination of alignment information are discussed below.

Low Latency 3-Axis Accelerometer Calibration

Figure 7:
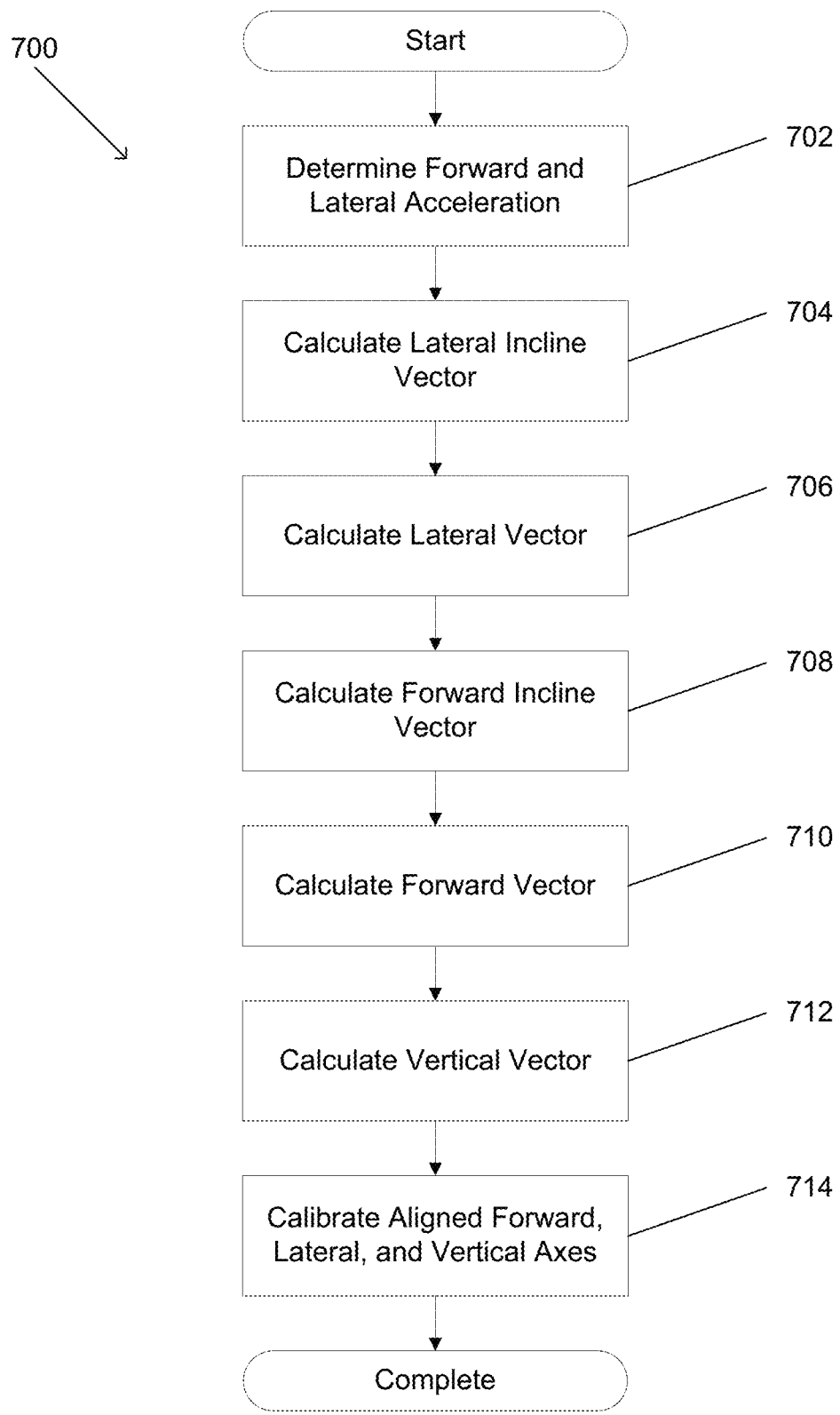
FIG. 7 is a flow chart illustrating a process for the low latency calibration of a 3-axis accelerometer in accordance with an embodiment of the invention.

During the operation of a vehicle, drivers benefit from receiving warning and alerts as quickly as possible so corrective action can be taken. Many of these alerts depend upon acceleration information measured using 3-axis accelerometers. By performing a low latency alignment of a 3-axis accelerometer, acceleration information can be provided quickly, enabling warnings and alerts to be generated with short delays. Telematics units in accordance with embodiments are configured to determine lateral incline vectors and forward incline vectors using measured acceleration information; these vectors can be utilized to determine alignment information in a low latency fashion. A process for low latency acceleration alignment in accordance with an embodiment of the invention is shown in FIG. 7. The process 700 includes measuring (702) forward and lateral acceleration. A lateral incline vector is calculated (704). A lateral vector is calculated (706). A forward incline vector is calculated (708). A forward vector is calculated (710). A vertical vector is calculated (712). Acceleration axes are calibrated (714).

In a variety of embodiments, measuring (702) forward and/or lateral acceleration is performed using a GPS receiver and/or 3-axis accelerometer. In several embodiments, measuring (702) forward and/or lateral acceleration is performed using processes similar to those described above. In many embodiments, a lateral incline vector ($A_{lat-incline}$) can be calculated (704) such that:

$$A_{lat-incline}=A_{mems}-L_{gps}*\text{Norm}(F_{calb}\times A_{mems})$$

where $A_{mems}$ is a vector representing the acceleration data typically provided by a 3-axis accelerometer, $F_{calb}$ is the calibrated forward vector, and $L_{gps}$ is the lateral acceleration of a vehicle. In a number of embodiments, $L_{gps}$ is determined using a GPS receiver. In several embodiments, $A_{lat-incline}$ is calculated by determining the accelerometer acceleration vector ($A_{mems}$) and forward vector ($F_{calb}$) and computing the cross product of the two vectors. In a variety of embodiments, the resulting vector is normalized.

In several embodiments, a lateral vector ($A_{lat}$) can be calculated (706) using the formula:

$$A_{lat}=\text{Norm}(F_{calb}\times A_{lat-incline})$$

where $F_{calb}$ is the calibrated forward vector and $A_{lat-incline}$ is the lateral incline vector.

In a similar fashion, in several embodiments of the invention, a forward incline vector ($A_{forw-incline}$) can be calculated (708) such that:

$$A_{forw-incline}=A_{mems}-F_{gps}*\text{Norm}(A_{lat-incline}\times A_{lat})$$

where $A_{lat-incline}$ is the lateral incline vector, $A_{lat}$ is the lateral vector, $F_{gps}$ is the measured forward acceleration, and $A_{mems}$ is the acceleration vector. In a variety of embodiments, ($A_{lat-incline}\times A_{lat}$) is normalized.

In many embodiments, the forward vector ($A_{forw}$) can be calculated (710) such that:

$$A_{forw}=\text{Norm}(A_{forw-incline}\times A_{lat})$$

where $A_{forw-incline}$ is the forward incline vector and ($A_{lat}$) the lateral vector. In a variety of embodiments ($A_{forw-incline}\times A_{lat}$) is normalized to determine the forward vector ($A_{forw}$). Once the lateral and forward vectors are calculated, the vertical vector ($A_{vert}$) may be calculated (712) such that:

$$A_{vert}=\text{Norm}(A_{lat}\times A_{forw})$$

where $A_{lat}$ is the lateral vector and $A_{forw}$ is the forward vector. In a variety of embodiments ($A_{lat}\times A_{forw}$) is normalized to determine the vertical vector ($A_{vert}$).

In a variety of embodiments, the axes of the 3-axis accelerometer are calibrated (714) to the axes of the vehicle using the aligned (706, 710, 712) forward, lateral, and vertical vectors. In several embodiments of the invention, the aligned lateral vector ($A_{lat}$), forward vector ($A_{forw}$), and vertical vector ($A_{vert}$), are used to calibrate (714) the aligned lateral, forward, and vertical axes such that:

$$\text{Aligned Lateral Axis}=A_{lat}*A_{mems}$$

$$\text{Aligned Forward Axis}=A_{forw}*A_{mems}$$

$$\text{Aligned Vertical Axis}=A_{vert}*A_{mems}$$

As discussed above, the acceleration information utilized above is obtained from 3-axis accelerometers and GPS receivers at a sampling rate related to the device providing the information. In many embodiments, the determination of the lateral incline vector and the forward incline vector utilizes fewer samples (a variety of embodiments utilize half the number of samples) than accumulating information from the 3-axis accelerometer and the GPS receiver and directly calculating the calibration information for the forward, lateral, and vertical axes of the 3-axis accelerometer and the vehicle using the accumulated samples while maintaining equivalent performance in the calibration. By utilizing fewer samples to determine the alignment information used to calibrate the 3-axis accelerometer to the vehicle axes, telematics systems utilizing lateral incline vectors and forward incline vectors in the calibration as described above exhibit low latency in the calibration of the 3-axis accelerometer to the vehicle axes.

Although specific processes for the low latency calibration of the aligned lateral, forward, and vertical vectors are discussed above with respect to FIG. 7, any of a variety of processes, including those utilizing alternative methods for determining accelerations other than GPS receivers and 3-axis accelerometers, can be utilized in accordance with embodiments of the invention. Processes for alignment methods utilizing vertical sample buffers in accordance with embodiments of the invention are discussed further below.

Acceleration Alignment with Vertical Sample Buffers

Figure 8:
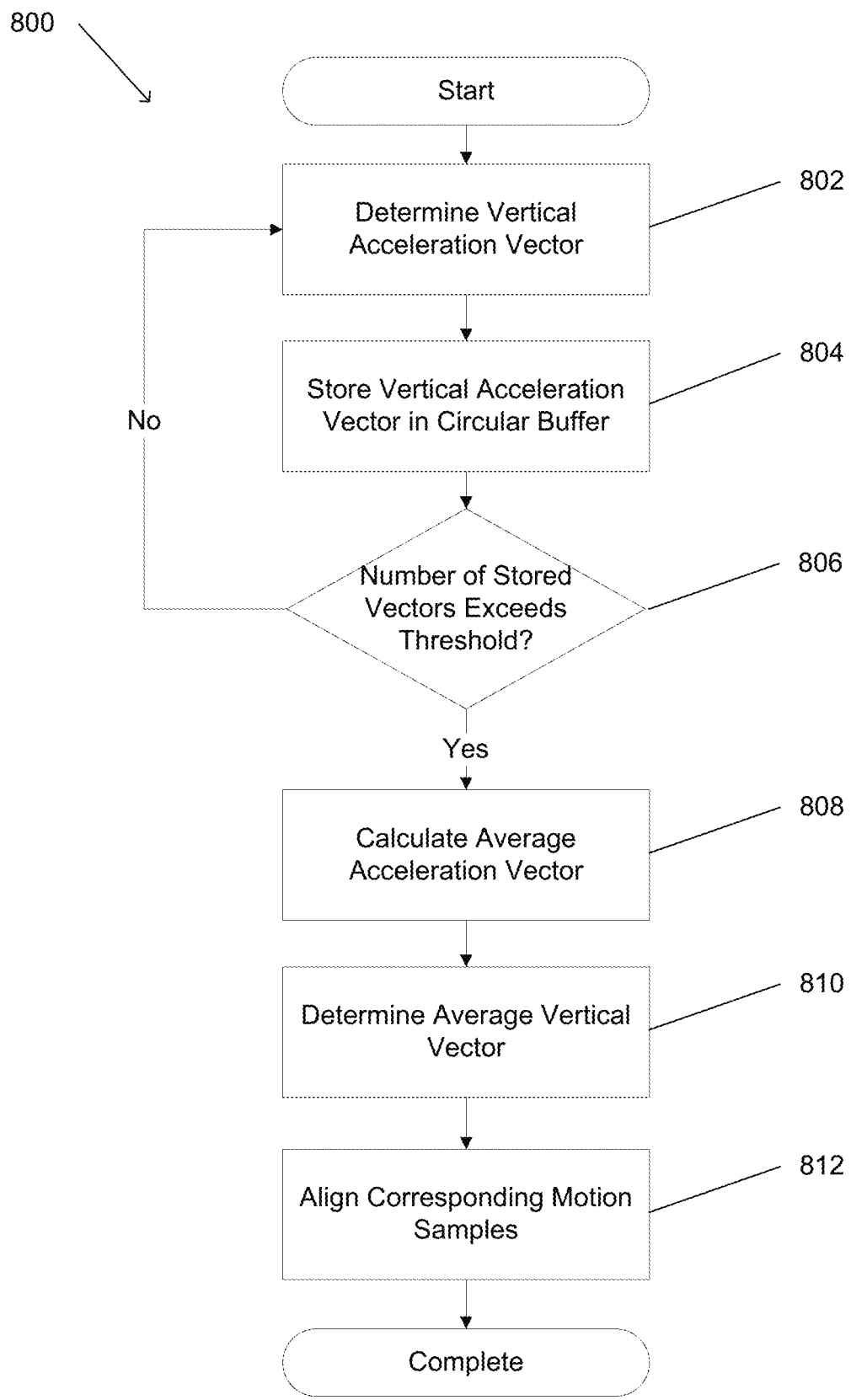
FIG. 8 is a flow chart illustrating a process for the calibration of a 3-axis accelerometer with vertical sample buffers in accordance with an embodiment of the invention.

Information determined via a GPS receiver can include measurement errors unique to each sample of information obtained; these errors induce additional noise and errors in the calibration of 3-axis accelerometers using the GPS-determined acceleration data. Telematics units in accordance with embodiments of the invention are configured to utilize vertical sample buffers to determine an average vertical vector that compensates for the measurement errors in the samples obtained from the GPS receiver. A process for utilizing vertical vector stabilization in the calibration of 3-axis accelerometers in accordance with an embodiment of the invention is shown in FIG. 8. The process 800 includes determining (802) vertical acceleration vectors. One or more vertical acceleration vectors are stored (804). If the number of stored vectors does not exceed (806) a threshold value, more vertical acceleration vectors are determined (802). If the number of stored vectors exceeds (806) a threshold value, an average acceleration vector is calculated (808). The threshold value can be determined dynamically and/or be predetermined. The average acceleration vector is processed. An average vertical vector (810) is determined. Corresponding motion samples are aligned (812).

In a variety of embodiments, determining (802) vertical acceleration vectors is performed using processes similar to those described above. In a number of embodiments, the determined (802) vertical acceleration vectors are measured using a GPS receiver. In several embodiments, the determined (802) vertical acceleration vectors are stored (804) using a vertical sample buffer. In many embodiments, the vertical sample buffer is a circular buffer; circular buffers in accordance with embodiments of the invention are configured to store a number of vertical acceleration vectors. Once the circular buffer has reached its capacity, the oldest vector is dropped (or overwritten) and a new vertical acceleration vector takes its place. In several embodiments, the vertical sample buffer is configured to associate metadata including, but not limited to a timestamp, with a particular vertical acceleration vector. Once the vertical sample buffer has reached its capacity, the metadata is utilized to determine which vertical acceleration vector is dropped (or overwritten). The capacity of the vertical acceleration buffer can be predetermined and/or determined dynamically. Other buffers and buffering techniques can be utilized according to the requirements of embodiments of the invention.

In many embodiments, the average acceleration vector is calculated (808) by accumulating the previous calculated vertical vectors and updating the average using each newly calculated vector utilizing a counter. In several embodiments, the stored vertical acceleration vectors are determined during different periods of time and include varying measurement errors. In a variety of embodiments, determining (810) an average vertical vector includes calculating a moving average using the stored (804) vertical acceleration vectors. In a number of embodiments, an average of the stored (804) vertical acceleration vectors is used to determine (810) the average vertical vector. The number stored (804) vertical acceleration vectors utilized to determine (810) the average vertical vector can be all of the stored (804) vectors or a portion of the stored (804) vectors. In a number of embodiments, the determined (810) average vertical vector is used to align (812) the corresponding motion samples by determining forward and lateral vectors using methods including, but not limited to, those discussed above. Utilizing the determined (810) average vertical vector, errors in the measurement of the vertical vectors are limited and aid in the accurate alignment (812) of the corresponding motion samples.

Although specific processes for performing acceleration alignment using vertical sample buffers are discussed above with respect to FIG. 8, any of a variety of processes appropriate to the requirements of a specific application can be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:
1. A telematics system, comprising:
   a processor;
   an acceleration sensor connected to the processor, wherein the acceleration sensor is a 3-axis accelerometer configured to determine an acceleration sensor vector comprising forward acceleration information along a forward axis, lateral acceleration information along a lateral axis, and vertical acceleration information along a vertical axis, wherein the forward axis, the lateral axis, and the vertical axis are defined by a first orientation of the acceleration sensor;
   a velocity sensor mounted to a vehicle and connected to the processor and configured to determine velocity information along a vehicular forward axis and heading information, wherein the vehicular forward axis is defined by a second orientation of the vehicle and the heading information is relative to the second orientation of the vehicle; and
   a memory connected to the processor and configured to store an acceleration alignment application;

wherein the acceleration alignment application configures the processor to:
- determine vehicular forward acceleration information along the vehicular forward axis using the velocity information;
- determine vehicular lateral acceleration information using the velocity information and the heading information;
- determine a lateral incline vector as a difference of the acceleration sensor vector and a dot product of the vehicular lateral acceleration information with a normalized cross product of a calibrated forward vector and the acceleration sensor vector;
- calculate a lateral acceleration vector as a normalized cross product of the calibrated forward vector and the lateral incline vector;
- determine a forward incline vector as a difference of the acceleration sensor vector and a dot product of the vehicular forward acceleration information and a normalized cross product of the lateral incline vector and the lateral acceleration vector;
- calculate a forward acceleration vector as a normalized cross product of the forward incline vector and the lateral acceleration vector;
- calculate a vertical acceleration vector as a normalized cross product of the lateral acceleration vector and the forward acceleration vector;
- compute lateral alignment information as a dot product of the lateral acceleration vector and the acceleration sensor vector;
- compute forward alignment information as a dot product of the forward acceleration vector and the acceleration sensor vector; and
- compute vertical alignment information as a dot product of the vertical acceleration vector and the acceleration sensor vector;
- wherein the lateral alignment information, the forward alignment information, and the vertical alignment information calibrate the first orientation of the acceleration sensor to the second orientation of the vehicle.

2. The telematics system of claim 1, wherein the calibrated forward vector aligns the vehicular forward axis with the forward axis.

3. The telematics system of claim 2, wherein:
the acceleration alignment application further configures the processor to determine a vehicular lateral axis using the heading information and the vehicular forward acceleration information; and
the calibrated forward vector further aligns the vehicular lateral axis with the lateral axis.

4. A method for calibrating axes of an acceleration sensor using a telematics system, where the telematics system is mounted in a vehicle having a vehicular forward axis, a vehicular lateral axis, and a vehicular vertical axis, the method comprising:
- determining, by the telematics system, vehicular forward acceleration information along the vehicular forward axis using a velocity sensor of the telematics system;
- determining, by the telematics system, vehicular lateral acceleration information along the vehicular lateral axis using the velocity sensor of the telematics system;
- determining, by the telematics system, a lateral incline vector as a difference of an acceleration sensor vector and a dot product of the vehicular lateral acceleration information with a normalized cross product of a calibrated forward vector and the acceleration sensor vector, wherein the acceleration sensor vector is determined by an acceleration sensor of the telematics system, and wherein the acceleration sensor vector comprises forward acceleration information along a forward axis, lateral acceleration information along a lateral axis, and vertical acceleration information along a vertical axis;
- calculating, by the telematics system, a lateral acceleration vector as a normalized cross product of the calibrated forward vector and the lateral incline vector;
- determining, by the telematics system, a forward incline vector as a difference of the acceleration sensor vector and a dot product of the vehicular forward acceleration information and a normalized cross product of the lateral incline vector and the lateral acceleration vector;
- calculating, by the telematics system, a forward acceleration vector as a normalized cross product of the forward incline vector and the lateral acceleration vector;
- calculating, by the telematics system, a vertical acceleration vector as a normalized cross product of the lateral acceleration vector and the forward acceleration vector;
- computing, by the telematics system, lateral alignment information as a dot product of the lateral acceleration vector and the acceleration sensor vector;
- computing, by the telematics system, forward alignment information as a dot product of the forward acceleration vector and the acceleration sensor vector; and
- computing, by the telematics system, vertical alignment information as a dot product of the vertical acceleration vector and the acceleration sensor vector, wherein the lateral alignment information, the forward alignment information, and the vertical alignment information calibrate axes of the acceleration sensor to axes of the vehicle.

5. The method of claim 4, wherein the calibrated forward vector aligns the vehicular forward axis with the forward axis using the telematics system.

6. The method of claim 5, further comprising:
aligning the vehicular lateral axis with the lateral axis using the calibrated forward vector using the telematics system.

* * * * *